United States Patent
Obinata

(10) Patent No.: US 11,721,129 B2
(45) Date of Patent: Aug. 8, 2023

(54) BEHAVIOR RECOGNITION METHOD, BEHAVIOR RECOGNITION DEVICE, AND COMPUTER-READABLE RECORDING MEDIUM

(71) Applicant: FUJITSU LIMITED, Kawasaki (JP)

(72) Inventor: Yuya Obinata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 213 days.

(21) Appl. No.: 17/171,212

(22) Filed: Feb. 9, 2021

(65) Prior Publication Data

US 2021/0271863 A1    Sep. 2, 2021

(30) Foreign Application Priority Data

Feb. 28, 2020 (JP) ................................ 2020-033365

(51) Int. Cl.
*G06V 40/20* (2022.01)
*G06T 7/73* (2017.01)

(52) U.S. Cl.
CPC ............... *G06V 40/20* (2022.01); *G06T 7/73* (2017.01); *G06T 2207/10016* (2013.01); *G06T 2207/30196* (2013.01)

(58) Field of Classification Search
CPC ........ G06V 40/20; G06V 20/52; G06V 40/25; G06V 40/28; G06V 10/44; G06T 7/73; G06T 2207/10016; G06T 2207/30196; G06T 7/246; G06K 9/6269; G06K 9/6273; G06N 3/0454
See application file for complete search history.

(56) References Cited

U.S. PATENT DOCUMENTS

| | | |
|---|---|---|
| 9,981,193 B2 | 5/2018 | Adams et al. |
| 10,949,658 B2* | 3/2021 | Brown ................... G06V 40/28 |
| 2015/0186713 A1 | 7/2015 | Cao et al. |
| 2017/0046568 A1* | 2/2017 | Bulzacki ............... A63F 13/847 |
| 2017/0344829 A1* | 11/2017 | Lan ....................... G06V 40/103 |
| 2017/0345181 A1 | 11/2017 | Yu et al. |
| 2020/0047747 A1 | 2/2020 | An et al. |
| 2020/0201340 A1* | 6/2020 | Cho ..................... G05D 1/0214 |

(Continued)

FOREIGN PATENT DOCUMENTS

| | | |
|---|---|---|
| CN | 110532874 | 12/2019 |
| JP | 2015-130151 | 7/2015 |

(Continued)

OTHER PUBLICATIONS

Rangesh, A., et al., "Pedestrians and their phones—Detecting Phone-Based Activities of Pedestrians for Autonomous Vehicles", 2016 IEEE 19th International Conference on Intelligent Transportation Systems (ITSC), IEEE, 2016, pp. 1882-1887.

(Continued)

*Primary Examiner* — Amara Abdi
(74) *Attorney, Agent, or Firm* — Staas & Halsey LLP

(57) ABSTRACT

A behavior recognition method includes acquiring positions of a plurality of respective joints and recognizing a partial behavior that is a subject to be recognized based on a feature value that is calculated from the positions of the respective joints using weights that are to be applied to the respective joints and that are changed according to a type of the partial behavior, by a processor.

12 Claims, 10 Drawing Sheets

(56) References Cited

U.S. PATENT DOCUMENTS

| | | |
|---|---|---|
| 2020/0237266 A1 | 7/2020 | Qiao et al. |
| 2021/0303833 A1 | 9/2021 | Huang et al. |

FOREIGN PATENT DOCUMENTS

| | | |
|---|---|---|
| WO | WO2015/103693 | 7/2015 |
| WO | WO2019/072243 | 4/2019 |

OTHER PUBLICATIONS

Rangesh, A. et al., "When Vehicles See Pedestrians with Phones A Multicue Framework for Recognizing Phone-Based Activities of Pedestrians", IEEE Transactions on intelligent Vehicles, Jun. 2018, vol. 3, No. 2, pp. 218-227.

Office Action, dated Sep. 28, 2021, in corresponding German Patent Application No. 102021201777.0 (18 pp.).

Patrona, F., Pattern Recognition, "Motion analysis: Action detection, recognition and evaluation based on motion capture data", vol. 76, Apr. 2018. pp. 612-622.

Chen et al., "Learning Weighted Joint-based Features for Action Recognition using Depth Camera", International Conference on Computer Vision Theory and Applications(VISAPP), pp. 549-556.

Ay et al., "Motion Classification Approach Based on Biomechanical Analysis of Human Activities", IEEE International Conference on Computational Intelligence and Computing Research (ICCIC), pp. 1-8.

Wang et al., "Mining Actionlet Ensemble for Action Recognition with Depth Cameras", 2012 IEEE Conference on Computer Vision and Pattern Recognition, pp. 1290-1297.

Ofli et al., "Sequence of the Most Informative Joints(SMIJ): A new representation for human skeletal action recognition", IEEE Computer Society Conference on Computer Vision and Pattern Recognition Workshops(CVPRW), pp. 8-13.

Search Report, dated Nov. 9, 2021, in Great Britain Patent Application No. GB2101800.7 (5 PP.).

\* cited by examiner

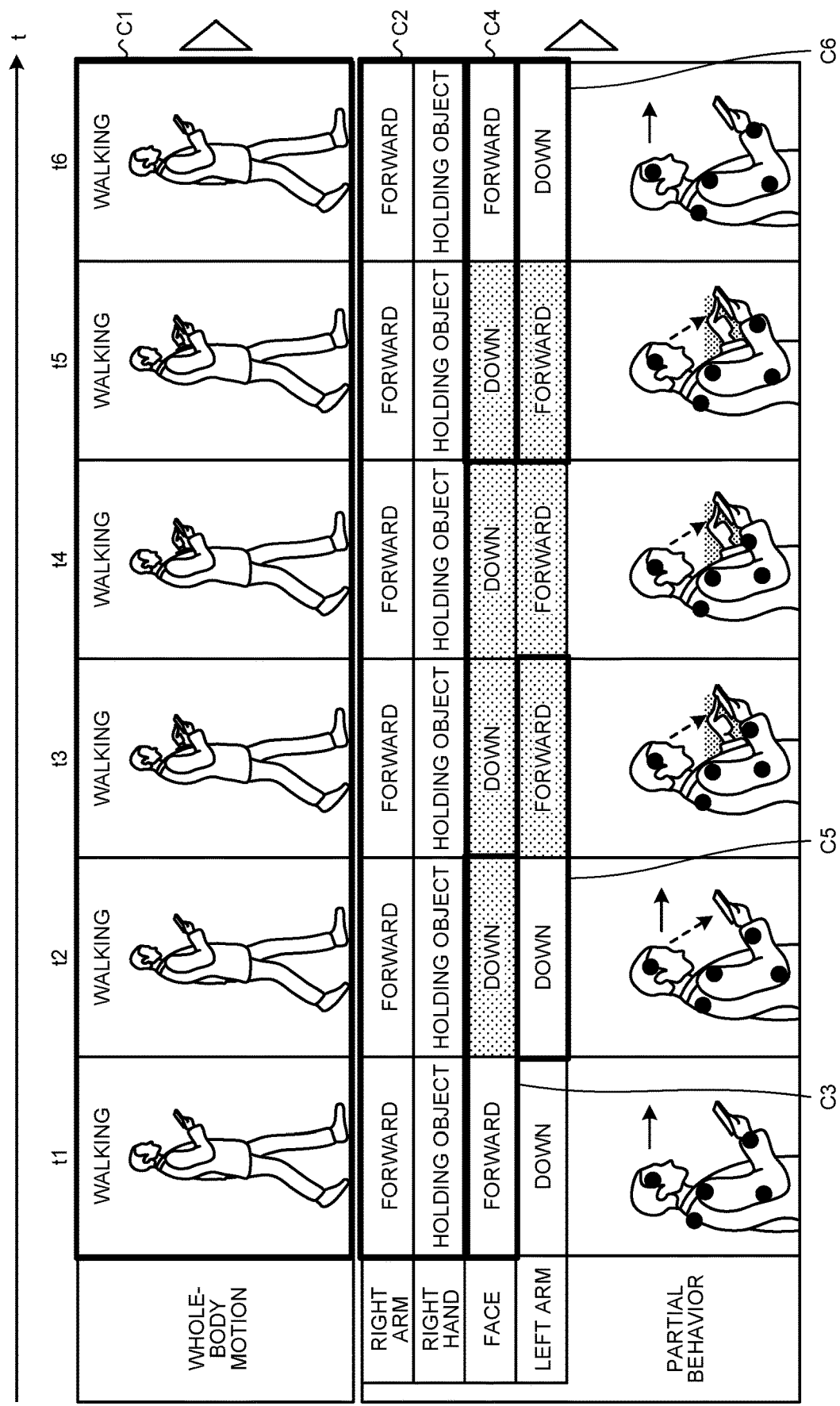

| ELEMENT BEHAVIOR | JOINT | | | | | | | |
|---|---|---|---|---|---|---|---|---|
| | RIGHT WRIST | RIGHT ELBOW | RIGHT SHOULDER | LEFT WRIST | LEFT ELBOW | LEFT SHOULDER | ... | LEFT ANKLE |
| RAISING RIGHT HAND | 1 | 1/2 | 1/4 | 0 | 0 | 0 | ... | 0 |
| RAISING LEFT HAND | 0 | 0 | 0 | 1 | 1/2 | 1/4 | ... | 0 |
| ... | ... | ... | ... | ... | ... | ... | ... | ... |

FIG.6

| NAME OF BEHAVIOR | JOINT | | | | | | | | IDENTIFICATION BOUNDARY PARAMETER |
|---|---|---|---|---|---|---|---|---|---|
| | RIGHT WRIST | RIGHT ELBOW | RIGHT SHOULDER | LEFT WRIST | LEFT ELBOW | LEFT SHOULDER | ... | LEFT ANKLE | |
| RAISING RIGHT HAND | 1 | 1/2 | 1/4 | 1/32 | 1/16 | 1/8 | ... | 1/128 | a, b (RAISING RIGHT HAND) |
| RAISING LEFT HAND | 1/32 | 1/16 | 1/8 | 1 | 1/2 | 1/4 | ... | 1/32 | a, b (RAISING LEFT HAND) |
| ... | ... | ... | ... | ... | ... | ... | ... | ... | ... |

FIG.7

| COOPERATIVE JOINT \ JOINT | RIGHT WRIST | RIGHT ELBOW | RIGHT SHOULDER | LEFT WRIST | LEFT ELBOW | LEFT SHOULDER | RIGHT WAIST | ... | LEFT ANKLE |
|---|---|---|---|---|---|---|---|---|---|
| RIGHT WRIST | 1 | 1 | 1 | 0 | 0 | 0 | 0 | ... | 0 |
| RIGHT ELBOW | 1 | 1 | 1 | 0 | 0 | 0 | 0 | ... | 0 |
| RIGHT SHOULDER | 1 | 1 | 1 | 0 | 0 | 0 | 0 | ... | 0 |
| LEFT WRIST | 0 | 0 | 0 | 1 | 1 | 1 | 0 | ... | 0 |
| LEFT ELBOW | 0 | 0 | 0 | 1 | 1 | 1 | 0 | ... | 0 |
| LEFT SHOULDER | 0 | 0 | 0 | 1 | 1 | 1 | 0 | ... | 0 |
| ... | ... | ... | ... | ... | ... | ... | ... | ... | ... |
| LEFT ANKLE | 0 | 0 | 0 | 0 | 0 | 0 | 0 | ... | 1 |

BEHAVIOR RECOGNITION METHOD, BEHAVIOR RECOGNITION DEVICE, AND COMPUTER-READABLE RECORDING MEDIUM

CROSS-REFERENCE TO RELATED APPLICATION

This application is based upon and claims the benefit of priority of the prior Japanese Patent Application No. 2020-033365, filed on Feb. 28, 2020, the entire contents of which are incorporated herein by reference.

FIELD

The embodiments discussed herein are related to a behavior recognition method, a behavior recognition program, and a behavior recognition device.

BACKGROUND

As a technique to recognize a behavior from a video, a technique to recognize a behavior from basic features of 15 physical joints that are estimated from each frame of a 3D video, that is, features, such as a posture, a speed and a move, is known (for example, refer to Japanese Laid-open Patent Publication No. 2015-130151).

SUMMARY

According to an aspect of the embodiments, a behavior recognition method includes: acquiring positions of a plurality of respective joints; and recognizing a partial behavior that is a subject to be recognized based on a feature value that is calculated from the positions of the respective joints using weights that are to be applied to the respective joints and that are changed according to a type of the partial behavior, by a processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a schematic diagram illustrating an example of application of the behavior recognition service according to the first embodiment;

FIG. 6 is a diagram representing an example of first weight data;

FIG. 7 is a diagram representing an example of second weight data;

DESCRIPTION OF EMBODIMENTS

The aforementioned technique however is sometimes with a difficulty in recognizing a behavior of which move appears in part of a body.

With the technique, a behavior is recognized from basic features that are extracted from the 15 physical joints, that is, features, such as a posture, a speed and a move. As described above, in the aforementioned technique, features, such as a posture, a speed and a move relating to the joints of the whole body are used to recognize a behavior. For this reason, in the technique, when a behavior that is a subject to be recognized is a motion of which move appears only in part of a body, a motion appearing in another part hinders the recognition and thus accuracy of the recognition lowers.

Accordingly, it is an object in one aspect of an embodiment of the invention to provide a behavior recognition method, a behavior recognition program and a behavior recognition device that make it possible to realize recognition of a behavior of which move appears in part of a body.

Preferred embodiments will be explained with reference to accompanying drawings. The embodiments do not limit the disclosed technique. It is possible to combine the embodiments as appropriate within a scope in which no inconsistency is caused in the process content.

[a] First Embodiment

Example of Behavior Recognition Service

Figure 1:
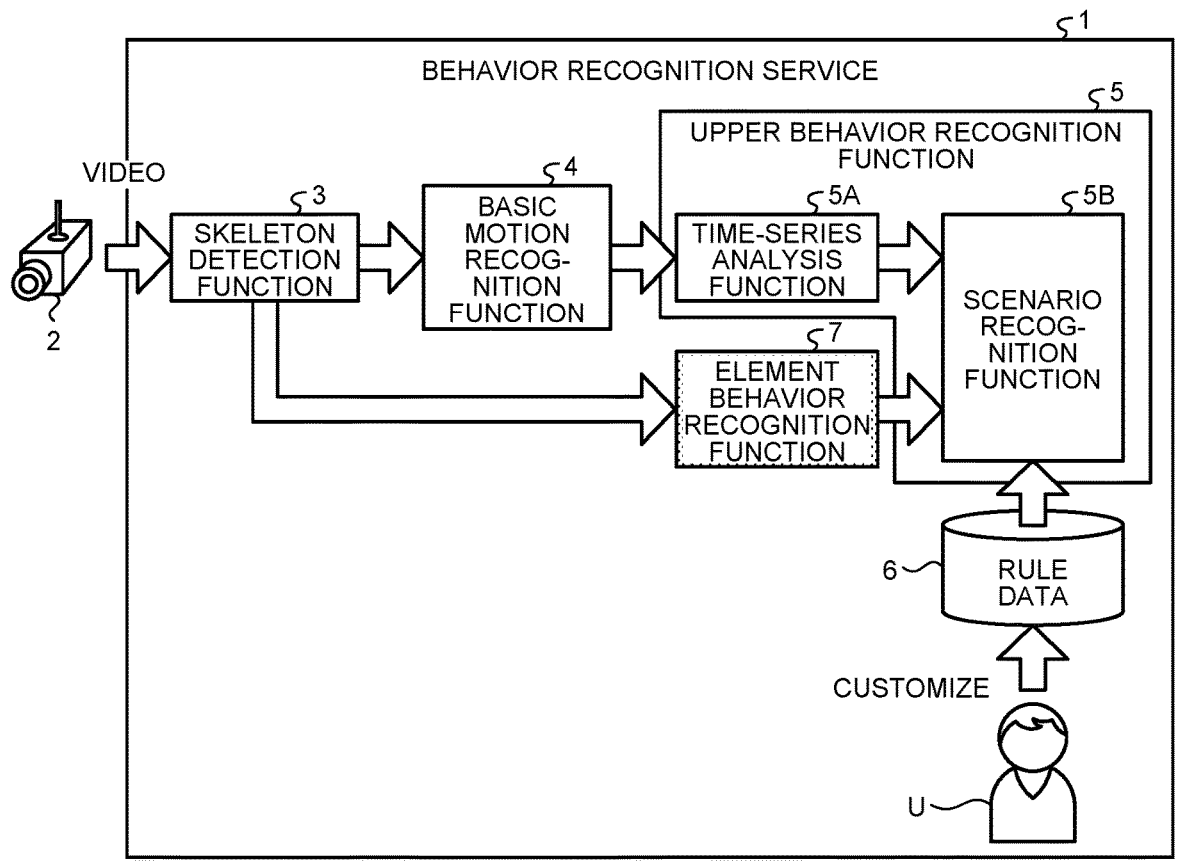
FIG. 1 is a diagram illustrating an example of a behavior recognition service according to a first embodiment.

FIG. 1 is a diagram illustrating an example of a behavior recognition service according to a first embodiment. A behavior recognition service 1 illustrated in FIG. 1 provides, for example, a service of recognizing a behavior of a subject, such as a human, from a video of a camera 2. In the behavior recognition service 1, as an example only, an upper behavior that is complicated because multiple motions are combined, for example, a suspicious behavior or a purchasing behavior is a subject to be recognized.

Except for the aforementioned behavior recognition service 1, to recognize the "upper behavior", a lot of videos containing the behavior has to be prepared as training data. Preparing such a lot of training data may be practically difficult or, even when a lot of training data can be prepared, it may take time and effort and thus there is an aspect that introducing upper-behavior recognition into the field is difficult.

To eliminate a need for preparing such a lot of training data, the behavior recognition service 1 recognizes the upper behavior according to a rule that defines combinations of "element behaviors" that can be contained as "basic motions" that are taken in daily life and elements of the upper behavior.

As illustrated in FIG. 1, the behavior recognition service 1 can contain a skeleton detection function 3, a basic motion recognition function 4, and an upper behavior recognition function 5.

The skeleton detection function 3 is a function of detecting, in each frame of a video that is captured by the camera 2, skeleton information containing the position of each joint of a subject. As an example only, the skeleton detection function 3 can be implemented by a two-dimensional or three-dimensional motion capture technique.

The basic motion recognition function 4 is a function of recognizing a basic motion from the skeleton information of each frame. As an example only, the basic motion recognition function 4 can be implemented using a model that has learnt basic motions according to a machine learning algorithm, such as deep learning.

For example, the "basic motions" can contain "whole-body behaviors" of which moves appear in a whole human body and "partial behaviors" of which moves appear in part of a human body. Behaviors, such as "walking", "running" and "stopping", can be taken as an example of the "whole-body behaviors". Behaviors, such as "raising the right hand", "looking down" and "looking ahead", can be taken as an example of the "partial behaviors".

The "whole-body behaviors" and the "partial behaviors" are "basic motions" that are taken ordinarily and thus are simple motions compared to "upper behaviors". For this reason, collecting videos of the "basic motions" is easy and accurate recognition of the "basic motions" can be realized using the trained model.

The upper behavior recognition function 5 is a function of recognizing the upper behavior. As illustrated in FIG. 1, the upper behavior recognition function 5 further contains a time-series analysis function 5A and a rule collation function 5B.

The time-series analysis function 5A is a function of analyzing whether a basic motion corresponds to a given time-series pattern. For example, continuity of the basic motion or a transition of the state of the basis motion are taken as examples of the time-series pattern. A basic motion corresponding to such a time-series pattern is recognized as an "element behavior".

The rule collation function 5B is a function of collating the result of recognizing a basic behavior and an element behavior and a rule 6. When the rule 6 is met, an upper behavior that is a subject to be recognized is recognized.

In one aspect, the rule 6 defines the upper behavior that is the subject to be recognized according to a combination of basic behaviors and element behaviors. For example, the combination may contain basic behaviors or element behaviors or both basic behaviors and element behaviors. When the rule 6 defines multiple combinations, an order and a logical relationship among the combinations can be defined.

In the aforementioned behavior recognition service 1, it is possible to set the rule 6 according to not only a system definition but also a user definition. For example, allowing a user U, such as a system engineer on the side of a business operator that provides the above-described behavior recognition service 1 or a customer of the behavior recognition service 1, to edit the rule 6 enables customization by the user U.

FIG. 1 selectively exemplifies the time-series analysis. In parallel with the time-series analysis, a spatial analysis on whether a site where a basic behavior occurs meets a given spatial condition, for example, whether the site is within a region of interest (ROI) may be made. For example, when a suspicious behavior is a subject to be recognized, a subject to be monitored, for example, in the case of picking, a door or the vicinity of the door can be set as an ROI. When a purchasing behavior is a subject to be recognized, a shelf of goods can be set as an ROI.

Example of Applying Behavior Recognition Service

Figure 2:
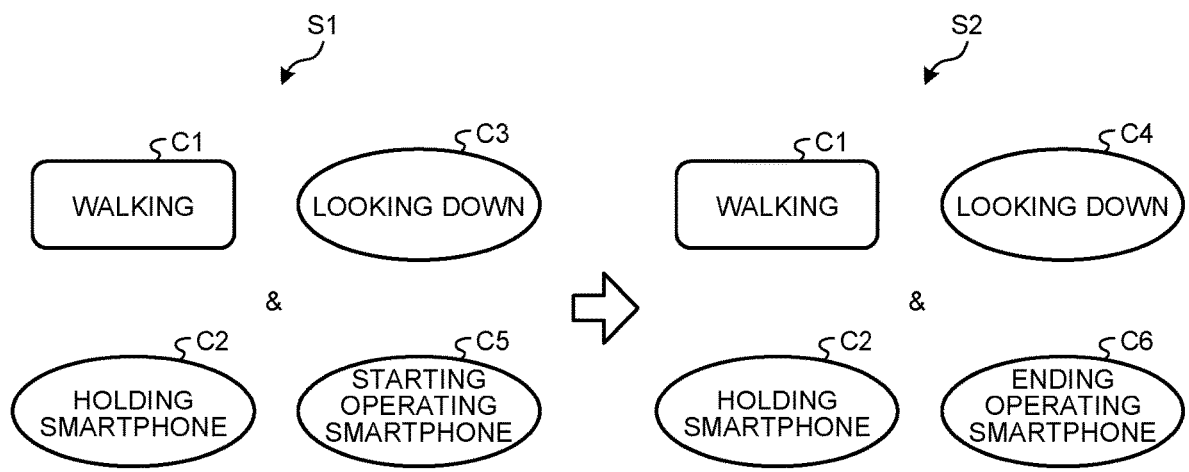
FIG. 2 is a diagram representing an example of a rule.

Using FIGS. 2 and 3, an example of applying the behavior recognition service 1 according to the first embodiment will be described. FIG. 2 is a diagram representing an example of the rule 6. FIG. 2 represents a rule that defines "using a smartphone while walking" as an example of an upper behavior that is a subject to be recognized. As illustrated in FIG. 2, the rule 6 defines a combination in each steps in the order from step S1 to step S2. For example, a whole-body behavior C1 "walking", an element behavior C2 "holding a smartphone", an element behavior C3 "looking down", and an element behavior C5 "starting operating a smartphone" are set in step S1. In step S2, the whole-body behavior C1 "walking", the element behavior C2 "holding a smartphone", an element behavior C4 "looking ahead", and an element behavior C6 "ending operating a smartphone" are set.

FIG. 3 is a schematic diagram illustrating an example of application of the behavior recognition service 1 according to the first embodiment. FIG. 3 schematically represents a result of recognizing a whole behavior and partial behaviors in each of frames t1 to t6 of a video that is input from the camera 2 under the circumstance in which the rule 6 represented in FIG. 2 is defined.

As represented in FIG. 3, the whole-body behavior C1 "walking" at steps S1 and S2 is recognized continuously from the frame t1 to the frame t6. A partial behavior of the right arm "forward" and a partial behavior of the right hand "holding an object" continue from the frame t1 to the frame t6. Continuity of the partial behavior of the right arm "forward" and the partial behavior of the right hand "holding an object" corresponds to a time-series pattern of the element behavior "holding a smartphone". For this reason, the element behavior C2 "holding the smartphone" at steps S1 and S2 is continuously recognized from the frame t1 to the frame t6.

Furthermore, in the frames t1 and t2, the partial behavior of the face changes from "forward" to "down". Such a chronological change in the partial behavior of the face corresponds to a time-series pattern of the element behavior C3 "looking down". Accordingly, the element behavior C3 at step S1 is recognized at the instant of the frame t2. Furthermore, in the frames t2 and t3, the partial behavior of the left arm changes from "down" to "forward". Such a chronological change in the partial behavior of the left arm corresponds to a time-series pattern of the element behavior C5 "starting operating a smartphone". Accordingly, the element behavior C5 at step S1 is recognized at the instant of the frame t3.

As described above, at the instant of the frame t3, the whole-body behavior C1 "walking", the element behavior C2 "holding a smartphone", the element behavior C3 "looking down", and the element behavior C5 "starting operating a smartphone" are recognized under an AND condition. As a result, at the instant of the frame t3, step S1 is done.

Thereafter, in the frames t5 and t6, the partial behavior of the face changes from "down" to "forward". Such a chronological change in the partial behavior of the face corresponds to a time-series pattern of the element behavior C4 "looking ahead". Accordingly, the element behavior C4 at step S2 is recognized at the instant of the frame t6. Furthermore, in the frames t5 and t6, the partial behavior of the left arm changes from "forward" to "down". Such a chronological change in the partial behavior of the left arm corresponds to a time-series pattern of the element behavior C6 "ending operating a smartphone". Accordingly, the element behavior C6 at step S2 is recognized at the instant of the frame t6.

As described above, at the instant of the frame t6, the whole-body behavior C1 "walking", the element behavior C2 "holding a smartphone", the element behavior C4 "looking ahead", and the element behavior C6 "ending operating a smartphone" are recognized under an AND condition. As a result, at the instant of the frame t6, step S2 is done.

At the instant of the frame t6, both the step S1 and the step S2 in this order are done and thus the upper behavior of "using a smartphone while walking" that meets the rule 6 is recognized.

As described above, according to the behavior recognition service 1 according to the first embodiment, the upper behavior is recognized according to the rule 6 that defines combinations of basic motions and element behaviors, which makes it possible to eliminate necessity of preparing a lot of training data. Furthermore, according to the behavior recognition service 1 according to the first embodiment, it is possible to not only use the rule 6 that is preset by the system definition but also allow the user U to customize the rule 6, which makes it possible to realize recognition of the upper behavior corresponding to the field.

One Aspect of Problem

As described above, according to the behavior recognition service 1 according to the first embodiment, it is possible to customize the rule 6 using the basic motions and element behaviors that are preset by the system definition.

Element behaviors that are needed however vary according to the field and thus it is not necessarily possible to define an upper behavior corresponding to the field using only the preset element behaviors. To recognize element behaviors that are not preset, a time-series pattern used for a time-series analysis has to be set newly.

Setting a time-series pattern however has an aspect that, because expertise of both the behavior recognition service 1 and the field is needed and it takes time and effort, it is difficult to recognize element behaviors that are not preset.

Recognizing such element behaviors is difficult even with the technique described in the background part above. In other words, as described in the background part above, in the above-described technique, a behavior is recognized from basic features that are extracted from the 15 joints, that is, features, such as a posture, a speed, and a move. As described above, in the above-described technique, features, such as a posture, a speed, and a move relating to the joints of the whole body, are used to recognize a behavior. For this reason, in the above-described technique, when a behavior that is a subject to be recognized is a motion that appears only in part of the body, motions appearing in other parts hinder the recognition and accordingly lower accuracy of the recognition.

One Aspect of Approach to Solve Problem

Under the circumstances, in the first embodiment, an element behavior recognition function 7 of recognizing an element behavior that is a subject to be recognized based on feature values that are calculated using weights that are to be applied to respective joints and that are changed according to the type of the behavior is added on the behavior recognition service 1. The element behavior recognition function 7 employs an approach to solve the problem to inhibit motions appearing in other parts other than a part of the body corresponding to a behavior element that is a subject to be recognized from hindering recognition.

The element behavior is exemplified here simply as an example of the behavior that is a subject to be recognized. As an example only, the behavior that is a subject to be recognized may cover general behaviors of which moves appear in part of the body, for example, may be a partial behavior. For example, when a partial behavior is a subject to be recognized, the partial behavior that is a subject to be recognized may be recognized based on feature values that are calculated from time-series data of positions of respective joints using weights that are to be applied to the respective joints and that are changed according to the type of the partial behavior.

Figure 4A:
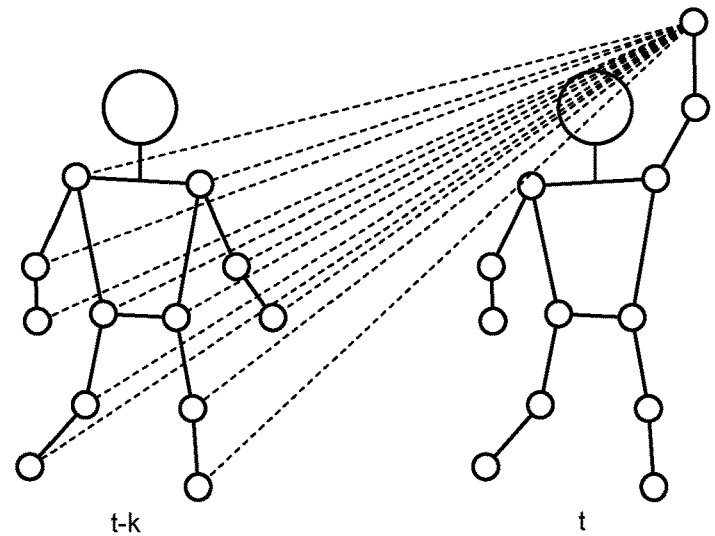
FIG. 4A is a schematic diagram illustrating weights to joints in application of a related technique.
Figure 4B:
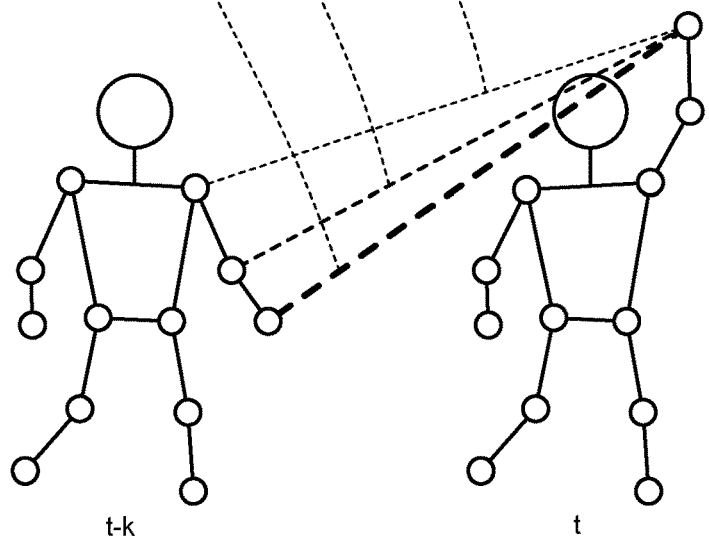
FIG. 4B is a schematic diagram illustrating weights to joints in application of an element behavior recognition function according to the first embodiment.

FIG. 4A is a schematic diagram illustrating weights to joints in the case where the related technique is applied. FIG. 4B is a schematic diagram schematically illustrating weights of the joints in the case where the element behavior recognition function 7 according to the first embodiment is applied. FIGS. 4A and 4B illustrate an example in which "raising the right hand", is a subject to be recognized as an example of the element behaver and illustrate a skeleton model containing the positions of the joints in a frame t−k and a frame t.

As an example only, an example is exemplified in which, a difference between the position of each joint in the frame t and the position of each joint in the frame t−k, that is, a relative position is calculated as a speed feature and the element behavior that is a subject to be recognized is recognized based on the speed features of the respective joints.

Wen the speed features of the respective joints are calculated, a relative postilion is calculated with respect to each of the joints, such as the right and left wrists, elbows, shoulders, waist, knees, and ankles. For example, a speed feature of the right wrist is calculated based on a difference between the position of the joint of the right wrist in the frame t and the position of the joint of the right wrist in the frame t−k, a difference between the position of the joint of the right wrist in the frame t and the position of the joint of the right elbow in the frame t−k, . . . , and a difference between the position of the joint of the right wrist in the frame t and the position of the joint of the left ankle in the frame t−k.

FIG. 4A represents, by the thickness of dotted lines, the magnitude of the weight that is applied to each joint of which relative position to the right wrist is calculated in the case where a speed feature of the right wrist is calculated in the related technique. As illustrated in FIG. 4A, the dotted lines have no difference in the thickness. In other words, the speed feature of the right wrist is calculated in the state where weights of the same magnitude are applied between the relative position that is calculated from the positions of the right wrist, the right elbow, the right shoulder, etc., relevant to the element behavior "raising the right hand" in the frame t−k and the relative position that is calculated from the positions of the left arm, the lower body, etc., irrelevant to the element behavior "raising the right hand" in the frame t−k.

In FIG. 4B, as an example only, the magnitudes of weights that are applied to the respective joints of which relative positions with respect to the right wrist in the case where a speed feature of the right wrist is calculated in the element behavior recognition function 7 are represented by the thickness of dotted lines. Different weights are applied between the relative position of a joint relevant to the element behavior "raising the right hand" in the frame t−k and the relative position of a joint irrelevant to the element behavior "raising the right hand" in the frame t−k. As illustrated in FIG. 4B, weights are applied according to weight data in which weights to be applied to the respective joints used to calculate the relative positions to a joint of which speed feature is to be calculated according to the type of the element behavior to be recognized. For example, a weight "1" is applied to a relative position that is calculated between the position of the joint of the right wrist in the frame t and the position of the joint of the right wrist in the frame t−k. A weight "½" is applied to a relative position that is calculated between the position of the joint of the right wrist in the frame t and the position of the joint of the right elbow in the frame t−k. A weight "¼" is applied to a relative position that is calculated between the position of the joint of the right wrist in the frame t and the position of the joint of the right shoulder in the frame t−k. On the other hand, a weight "0" is applied to a relative position that is calculated from the position of the joint, such as the left arm or the lower body, in the frame t−k. In this manner, the speed feature of the right wrist is calculated using a weight that is to be applied to a relative position that is calculated from the position of a joint relevant to the element behavior "raising the right hand" in the frame t−k and that is larger than the weight to be applied to a relative position that is calculated from the positon of a joint irrelevant to the element behavior "raising the right hand".

The relative positon that is calculated from the position of a part irrelevant to the element behavior "raising the right hand" results in an obstacle in recognizing the element behavior "raising the right hand", that is, a noise. As an example only, the case where a captured video of "raising the right hand while walking" and a captured video of "walking" are input is exemplified. Expediently, it is assumed that moves of joints other than the right wrist, the right elbow, and the right shoulder are the same between the two videos.

For example, when a skeleton model containing the positions of 12 joints in addition to the head is obtained, the number of joints of which positions are the same in each frame between the two videos is 9 excluding the right wrist, the right elbow, and the right shoulder. Even when the positons of the remaining three joints differ in each frame between the two videos, 75% (=9÷12×100) of the relative positions in calculation of a speed feature of the right wrist have the same values.

For this reason, according to the related technique, the same weight is applied to each joint and the 75% of (=9÷12×100) relative positions in calculation of a speed feature of the right wrist result in noise. This increases the possibility that the speed features of the right wrist that is calculated between the two videos are similar to each other. As a result, even a captured video of "walking" is recognized as the element behavior "raising the right hand" that is a subject to be recognized and accordingly the accuracy of recognition lowers.

On the other hand, according to the element behavior recognition function 7 according to the first embodiment, because a greater weight is applied to a joint relevant to the element behavior "raising the right hand" than a weight to a joint irrelevant to the element behavior "raising the right hand", it is possible to calculate a speed feature of the right wrist in the state where the noise is excluded. As a result, it is possible to inhibit even a captured video of "walking" from being recognized as the element behavior "raising the right hand" that is a subject to be recognized.

Thus, according to the element behavior recognition function 7, it is possible to realize recognition of an element behavior that is not preset as an example of a behavior of which move appears in part of the body. Furthermore, according to the element behavior recognition function 7, when an element behavior that is not preset is added to the rule, it is possible to reduce time of and effort in newly setting a time-series pattern that is used for a time-series analysis.

Functional Configuration of Behavior Recognition Device

Figure 5:
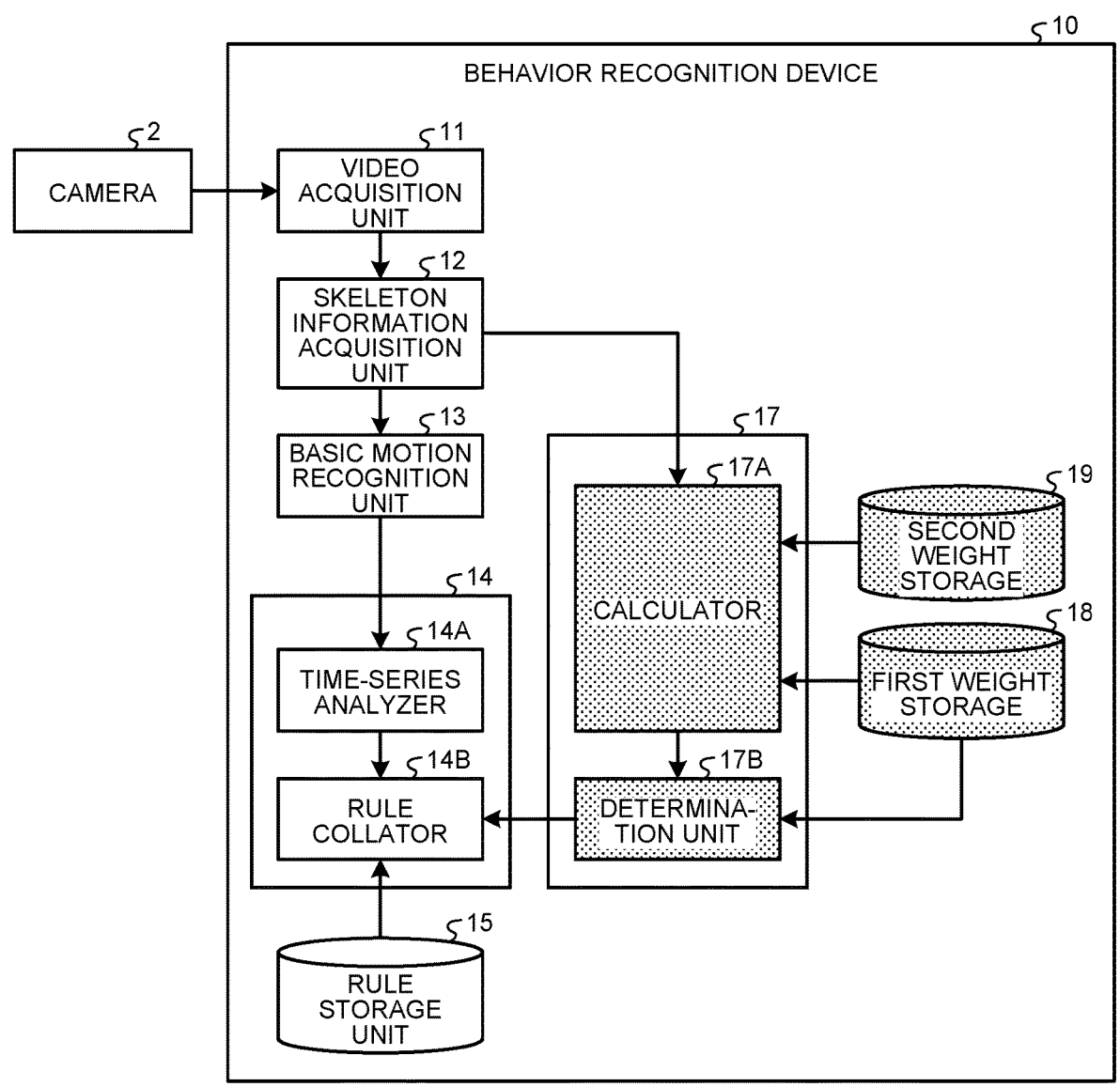
FIG. 5 is a block diagram illustrating an example of a functional configuration of a behavior recognition device according to the first embodiment.

FIG. 5 is a block diagram illustrating an example of a functional configuration of a behavior recognition device 10 according to the first embodiment. The behavior recognition device 10 illustrated in FIG. 5 corresponds to a computer that provides the above-described behavior recognition service 1.

In an embodiment, it is possible to implement the behavior recognition device 10 by installing a behavior recognition program that implements the above-described behavior recognition device 10 in a given computer as package software or online software. For example, the behavior recognition device 10 may be installed as a SaaS (Software as a Service) application, thereby providing the above-described behavior recognition service 1 as a cloud service. The behavior recognition device 10 is not limited to this, and the behavior recognition device 10 may be installed as a server that provides a function corresponding to the behavior recognition service 1 on premises.

As illustrated in FIG. 5, a camera 2 corresponding to an example of an imaging device is connectable to the behavior recognition device 10. The behavior recognition device 10 and the camera 2 are connectable to each other via a given network such that the behavior recognition device 10 and the camera 2 can communicate with each other. For example, the network may be any type of communication network, such as the Internet or a LAN (Local Area Network), regardless whether the network is wired or wireless. FIGS. 1 and 5 and expediently exemplify the example in which the single camera 2 is connected to the single behavior recognition device 10; however, this does not hinder multiple cameras 2 from being connected to the single behavior recognition device 10.

As illustrated in FIG. 5, the behavior recognition device 10 includes a video acquisition unit 11, a skeleton information acquisition unit 12, a basic motion recognition unit 13, an upper behavior recognition unit 14, a rule storage 15, an element behavior recognition unit 17, a first weight storage 18, and a second weight storage 19. The behavior recognition device 10 may include, in addition to the functional units illustrated in FIG. 5, various functional units of a known computer, for example, functions corresponding to an input/output interface and a communication interface.

The functional units, such as the video acquisition unit 11, the skeleton information acquisition unit 12, the basic motion recognition unit 13, the upper behavior recognition unit 14 and the element behavior recognition unit 17, are virtually implemented by a hardware processor, such as a central processing unit (CPU) or a micro processing unit (MPU). In other words, the processor reads a program, such as the behavior recognition program obtained by packaging the above-described behavior recognition service 1, in addition to an operating system (OS) from a storage device (not illustrated in the drawing), such as a hard disk drive (HDD), an optical disk or a solid state drive (SSD). The processor then executes the above-described behavior recognition program, thereby loading a process corresponding to the above-described functional units in a memory, such as a random access memory (RAM). As a result of executing the above-described behavior recognition program as described above, the above-described functional units are virtually implemented as the process. The CPU or MPU is exemplified as an example of the processor here, and the above-described functional units may be implemented by a given processor regardless whether the processor is a general-purpose one or a dedicated one. The above-described functional units or part of the functional units may be implemented using a wired logic by hardware, such as an application specific integrated circuit (ASIC) or a field programmable gate array (FPGA).

The above-described storages, such as the rule storage 15, the first weight storage 18 and the second weight storage 19 may be installed as an auxiliary storage device, such as an HDD, an optical disc, or an SSD, or may be installed by assigning part of the storage area of an auxiliary device.

The video acquisition unit 11 is a processor that acquires a video.

In an embodiment, the video acquisition unit 11 is able to acquire a video that is transmitted from the camera 2 frame by frame. The information source from which the video acquisition unit 11 acquires a video may be any information source and is not limited to the camera 2. For example, the video acquisition unit 11 is also able to acquire a video from an auxiliary storage device, such as a hard disk or an optical disc that stores videos, or from a removable medium, such as a memory card or a universal serial bus (USB). The video acquisition unit 11 is also able to acquire a video via a network NW from an external device other than the camera 2.

The skeleton information acquisition unit 12 is a processor that detects skeleton information containing positions of respective joints of a subject in each frame of the video. An example only, the skeleton information acquisition unit 12 inputs the video into a motion capture engine with respect to each frame in which the video is captured by the video acquisition unit 11, thereby being able to acquire the skeleton information containing the positions of the respective joints. For example, when two-dimensional motion capture is performed, sets of coordinates $(x^t_1, y^t_2)$, $(x^t_2, y^t_2)$, ... $(x^t_N, y^t_N)$ of a joint $n=1, \ldots, N$ in a frame t can be acquired. Indices n identify the right wrist, the right elbow, the right shoulder, the left wrist, . . . , and the left ankle according to the order of $n=1, \ldots, N$. The motion capture engine need not necessarily be executed by a processor on the behavior recognition device 10, and an external engine may be used.

The basic motion recognition unit 13 is a processor that recognizes a basic motion from the skeleton information on each frame. As an example only, the basic motion recognition unit 13 inputs the positions of respective joints that are acquired in each frame by the skeleton information acquisition unit 12 to a model that has learnt basic motions according to a machine learning algorithm, such as deep learning. Accordingly, a result of recognizing a basic motion can be acquired on a frame-by-frame basis.

The upper behavior recognition unit 14 is a processor that recognizes an upper behavior. As illustrated in FIG. 5, the upper behavior recognition unit 14 further includes a time-series analyzer 14A and a rule collator 14B.

The time-series analyzer 14A is a processor that analyzes whether a basic motion corresponds to a given time-series pattern. For example, continuity of the basic motion and transition of the state of the basis motion can be taken as an example of the time-series pattern. Such a basic motion corresponding to a time-series pattern is recognized as an "element behavior".

The rule collator 14B is a processor that collates a result of recognizing a basic behavior and an element behavior and a rule that is stored in the rule storage 15. For example, the rule collator 14B uses not only the element behavior that is recognized in the time-series analysis performed by the time-series analyzer 14A but also the element behavior that is recognized by the element behavior recognition unit 17, which is described below, are used for collation with the rule. When the rule is met, an upper behavior that is a subject to be recognized is recognized.

The rule storage 15 stores a rule that defines the upper behavior that is a subject to be recognized by a combination of basic behaviors and element behaviors. For example, the combination may contain basic behaviors or element behaviors or both basic behaviors and element behaviors. When the rule defines multiple combinations, an order and a logical relationship among the combinations can be defined.

As an example only, the rule storage 15 may store the rule 6 represented in FIG. 2, etc. As illustrated in FIG. 2, the rule 6 defines a combination in each step in the order from step S1 to step S2. For example, the basic behavior (whole-body behavior) C1 "walking", the element behavior C2 "holding a smartphone", the element behavior C3 "looking down", and the element behavior C5 "starting operating a smartphone" are set in step S1. In step S2, the basic behavior (whole-body behavior) C1 "walking", the element behavior C2 "holding a smartphone", the element behavior C4 "looking ahead", and the element behavior C6 "ending operating a smartphone" are set.

As described, it is possible to store the rule 6 that is set according to not only the system definition but also the user definition in the rule storage 15. For example, allowing the user U, such as a system engineer on the side of the business operator that provides the above-described behavior recognition service 1 or a customer of the behavior recognition service 1, to edit the rule 6 enables customization by the user U.

The element behavior recognition unit 17 is a processor that recognizes an element behavior that is a subject to be recognized. As illustrated in FIG. 5, the element behavior recognition unit 17 further includes a calculator 17A and a determination unit 17B.

The calculator 17A is a processor that calculates a feature value of an element behavior.

In one aspect, the calculator 17A changes the weight to be applied to each joint according to the type of the element behavior that is a subject to be recognized. A weight to each joint that is changed according to the type of an element behavior that is a subject to be recognized may be referred to as a "first weight" below.

An example of calculating a speed feature represented by Equation (1) below will be taken simply as an example of the feature value. In a speed feature represented by Equation (1) below, a speed feature $f_s(X^t_n)$ of a joint n in a frame t is calculated according to Equation (2) below. Note that "k" represented in Equation (2) below denotes a constant that is set previously and, for example, any natural number can be set.

$$\text{speed feature} = \{f_s(x_{right\ wrist}^t), f_s(x_{right\ elbow}^t), \ldots, f_s(x_{left\ ankle}^t)\} \quad (1)$$

$$f_s(x_n^t) = \{((x_n^t - x_i^{t-k}) \times b_n \times w^i) \mid i = 1, \ldots, N\}; t \quad (2)$$
$$= k+1, \ldots, T; k > 0$$

As an example only, an example in which a speed feature is calculated in the case where the element behavior that is a subject to be recognized is "raising the right hand" will be described.

First of all, the case where a speed feature $f_s(x^t_{right\ wrist})$ of the joint of the right wrist in the frame t is calculated among speed features of N joints in the frame t (the case where n=1) is exemplified. In other words, the calculator 17A sets a first weight $w^i$ in Equation (2) above according to the first weight data that is stored in the first weight storage 18.

FIG. 6 is a diagram representing an example of the first weight data. FIG. 6 represents, simply as an example of the weight data, weights to joints that have been learnt according to an algorism of machine learning, such as SVM (Support vector machine) and model parameters. As represented in FIG. 6, as an example the first weight data, data in which a first weight $w^i$ to each joint i=1, ..., N that is used to calculate a relative position with respect to the joint n of which speed feature is to be calculated is associated with each element behavior that is a subject to be recognized is usable as an example.

For example, when a relative position is calculated between the position of the joint of the right wrist in a frame t and the position of the joint of the right wrist in a frame t−k (when i=1), a weight "1" to the right wrist in the first weight data represented in FIG. 6 is set for a first weight $w^1$. When a relative position is calculated between the position of the joint of the right wrist in the frame t and the position of the joint of the right elbow in the frame t−k (when i=2), a weight "½" to the right elbow in the first weight data represented in FIG. 6 is set for a first weight $w^2$. Furthermore, when a relative position is calculated between the position of the joint of the right wrist in the frame t and the position of the joint of the right shoulder in the frame t−k (when i=3), a weight "¼" to the right shoulder in the first weight data represented in FIG. 6 is set for a first weight $w^3$. In this manner, the same process is repeated until the index i reaches N.

In another aspect, the calculator 17A changes the weight to be applied to each joint according to cooperativity among joints. A weight to each joint that is changed according to cooperativity among joints may be referred to as a "second weight" below.

For example, the calculator 17A sets a second weight $b_n$ in Equation (2) above according to second weight data that is stored in the second weight storage 19.

FIG. 7 is a diagram representing an example of the second weight data. As represented in FIG. 7, data in which a second weight $b_n$ to be applied to each joint i in the frame t−k that is used to calculate a relative position with respect to a joint n of which speed feature is to be calculated is associated with each joint n is usable as an example. For example, while a high value is set for the second weight as the cooperativity between the joint n and the joint i increases, a low value is set for the second weight as the cooperativity between the joint n and the joint i lowers.

For example, when a speed feature $f_s(x^t_{right\ wrist})$ of the right wrist is calculated (when n=1), the record in the first row of the second weight data represented in FIG. 7 is referred to. First of all, when a relative position is calculated between the position of the joint of the right wrist in the frame t and the position of the joint of the right wrist in the frame t−k (when i=1), a weight "1" to the right wrist that is identified by the index i=1 among the second weights to a joint i=1, ..., N contained in the record in the first row represented in FIG. 7 is set for a second weight bi. Also when the joints in the frame t−k are the right elbow and the right shoulder, "1" is set for the second weight bi. When a relative position is calculated between the position of the joint of the right wrist in the frame t and the position of the joint of the left wrist in the frame t−k (when i=4), a weight "0" to the left wrist that is identified by the index i=4 among the second weights to a joint i=1, ..., N contained in the record in the first row represented in FIG. 7 is set for the second weight bi. In this manner, the same process is repeated until the index i reaches N.

After the first weight $w^i$ and the second weight $b_n$ are set as described above, the calculator 17A assigns the position of each joint in the frame t and the position of each joint in the frame t−k to Equation (2) above, thereby calculating a speed feature $f_s(x^t_{right\ wrist})$ of the joint of the right wrist in the frame t. In the same manner, the calculator 17A calculates speed feathers of a speed feature $f_s(x^t_{right\ elbow})$ of the joint of the right elbow in the frame t, ..., a speed feature $f_s(x^t_{left\ ankle})$ of the joint of the left ankle in the frame t. Thereafter, the calculator 17A assigns the N speed features $f_s(x^t_1)$ to $f_s(x^t_N)$ in the frame t to Equation (1), thereby calculating a speed feature of the element behavior "raising the right hand" that is a subject to be recognized in the frame t.

FIGS. 6 and 7 exemplifies the case where each data is stored in a form of a table; however, this is an example only and the data structure is not limited to a relational database. For example, data that is described in a form of tags using a markup language, such as an XML (Extensible Markup Language), or data that is described using commas or line feeds, such as CSV (Comma-Separated Values), may be used.

FIG. 7 exemplifies the case where "1" or "0" is set as the second weight; however, the second weight is not necessarily limited to a binary digit of "1" or "0", and any value from "0" to "1" may be set.

The determination unit 17B is a processor that determines whether there is an element behavior that is a subject to be recognized based on a feature value that is calculated by the calculator 17A.

As an example only, the determination unit 17B inputs the speed feature that is calculated by the calculator 17A to the trained SVM model. For example, when the trained model is a linear identification model, the trained model outputs a label "1" with an element behavior or a label "0" without element behavior based on an identification boundary that is determined by an identification boundary parameter of the model represented in FIG. 6, that is, a slope a and an intercept b. In this manner, it is possible to identify whether there is an element behavior that is a subject to be recognized according to the label that is output from the trained model.

Such model parameters, for example, the slope a and the intercept b can be leant as an example only as follows. For example, a video corresponding to a positive example or a negative example of the element behavior that is a subject to be recognized and training data containing a correct label of the positive example and the negative example is used. Initial values are set for the "first weight" in Equation (3) below and the "identification boundary parameter" of the model and then the element behavior that is a subject to be recognized is recognized based on a speed feature that is calculated from the training data and the identification boundary parameter of the model. A process of updating the "first weight" and the "identification boundary parameter" is then repeated for a given number of times of epochs such that a loss function L in Equation (4) below is minimized. In Equation (4), "q(x)" denotes an activation function and, for example, a tan h function, a sigmoid function, or a RELU function can be used. In Equation (4), "$f_s$" denotes a first weight $w^i$ to be applied to each joint i. For example, the "first weight" and the "identification boundary parameter" are optimized by optimizing a logarithmic likelihood that maximizes a parameter $(t,q(f_s))$ on a loss function L whose value decreases as the number of correct solutions increases while the value increases as the number of correct solutions decreases.

$$f_s(x^t_{right\ wrist}) = \tag{3}$$

$$\{(x^t_{right\ wrist} - x^{t-k}_{right\ wrist}) \times \text{importance}_{right\ wrist-right\ wrist'}$$
$$(x^t_{right\ wrist} - x^{t-k}_{right\ elbow}) \times \text{importance}_{right\ wrist-right\ elbow'}$$
$$(x^t_{right\ wrist} - x^{t-k}_{right\ shoulder}) \times \text{importance}_{right\ wrist-right\ shoulder}\}$$

$$L(t, q(f_s)) = \log(1 + \exp(+tq(f_s))) \tag{4}$$

Flow of Process

A flow of a process performed by the behavior recognition device 10 according to the first embodiment will be described. A (1) model leaning process will be described and then a (2) behavior recognition process will be described.

(1) Model Learning Process

Figure 8:
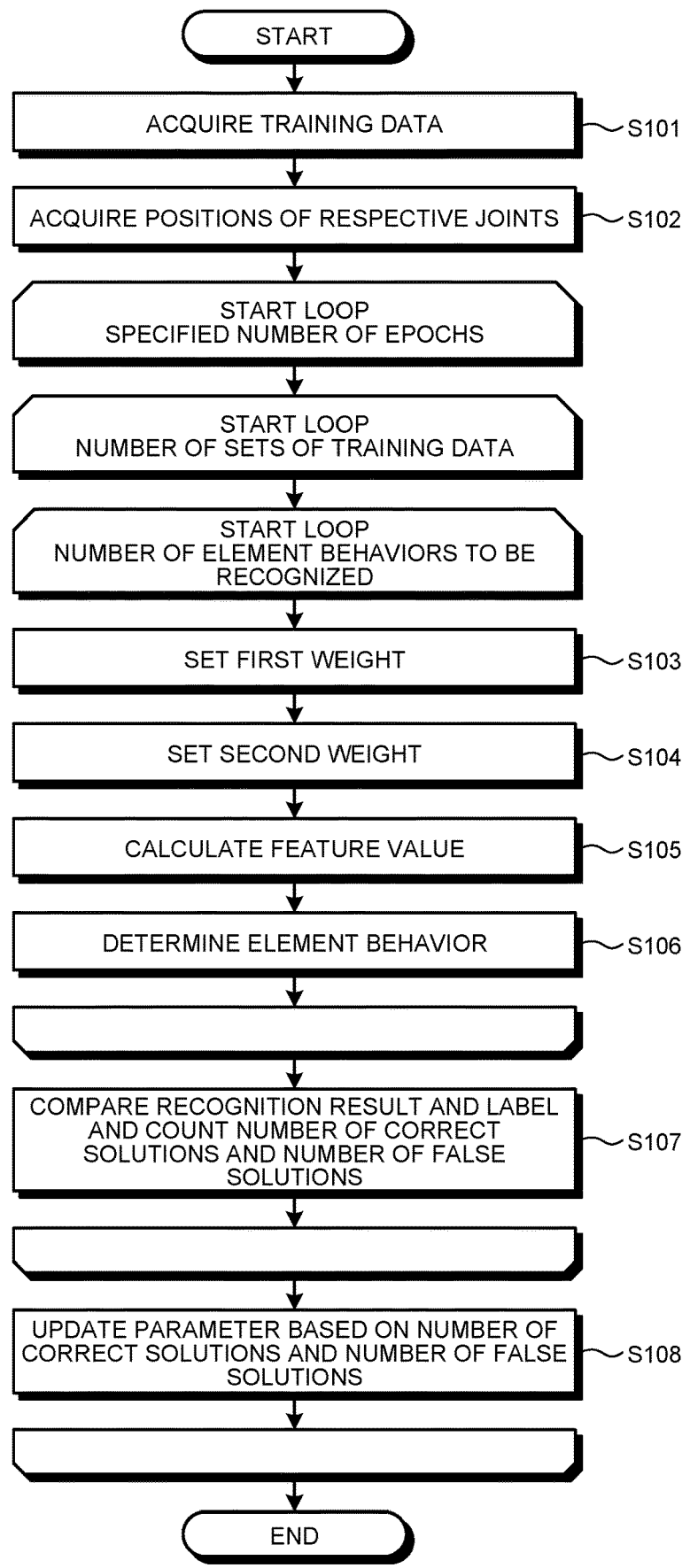
FIG. 8 is a flowchart representing a procedure of a model learning process according to the first embodiment.

FIG. 8 is a flowchart representing a procedure of the model learning process according to the first embodiment. The model learning process may be executed by any learning device including the behavior recognition device 10. For example, the model learning process is started when a request for model learning is received. Note that initial values are set for the "first weight" and the "identification boundary parameter" in Equation (3) above.

As illustrated in FIG. 8, the learning device acquires training data containing videos corresponding to a positive example or a negative example of an element behavior that is a subject to be recognized and a correct label of the positive example or the negative example (step S101).

The learning device then acquires time-series data on positions of joints from the video contained in each set of the training data that is acquired at step S101 (step S102).

Thereafter, the learning device repeats the process from step S103 below to step S108 below until a given number of epochs is reached and then ends the process. Furthermore, in one epoch, the learning device repeats the process from step S103 below and step S107 below for the number of times corresponding to the number of sets of training data. Furthermore, for one set of training data, the learning device repeats the process from step S103 below and step S106 below for the number of times corresponding to the number of element behaviors that are subjects to be recognized.

In other words, the learning device refers to the first weight data that is stored in the first weight storage 18 and sets, for each element behavior that is a subject to be recognized, a first weight $w^i$ to be applied to each joint i=1, . . . , N that is used to calculate a relative position with respect to a joint n (step S103). The learning device then refers to the second weight data that is stored in the second weight storage 19 and sets a second weight $b_n$ that is applied to each joint n=1, . . . , N of which speed feature is calculated and to each joint i=1, . . . , N in a frame t−k that is used to calculate a relative position with respect to the joint n (step S104).

The learning device then further assigns, to Equation (1) above, speed features $f_s(x^t_1)$ to $f_s(x^t_N)$ in N frames that are obtained by assigning the position of each joint in a frame t and the position of each joint in the frame t−k to Equation (2) after setting the first weights $w^i$ and the second weights $b_n$, thereby calculating a speed feature of the element behavior in the frame t (step S105).

The learning device inputs the speed feature of the element behavior in the frame t that is calculated at step S105 to an identification boundary parameter, for example, a model having a slope a and an intercept b, thereby determining whether there is an element behavior that is a subject to be recognized based on a label that is output from the model (step S106).

Thereafter, the learning device compares the result of recognizing the element behavior that is a subject to be recognized and the correct label and thus counts the number of correct solutions and the number of wrong solutions (step S107).

The learning device then updates the parameter containing the "first weight" and the "identification boundary parameter" based on the number of correct solutions and the number of wrong solutions that are counted at step S107 (step S108).

(2) Behavior Recognition Process

Figure 9:
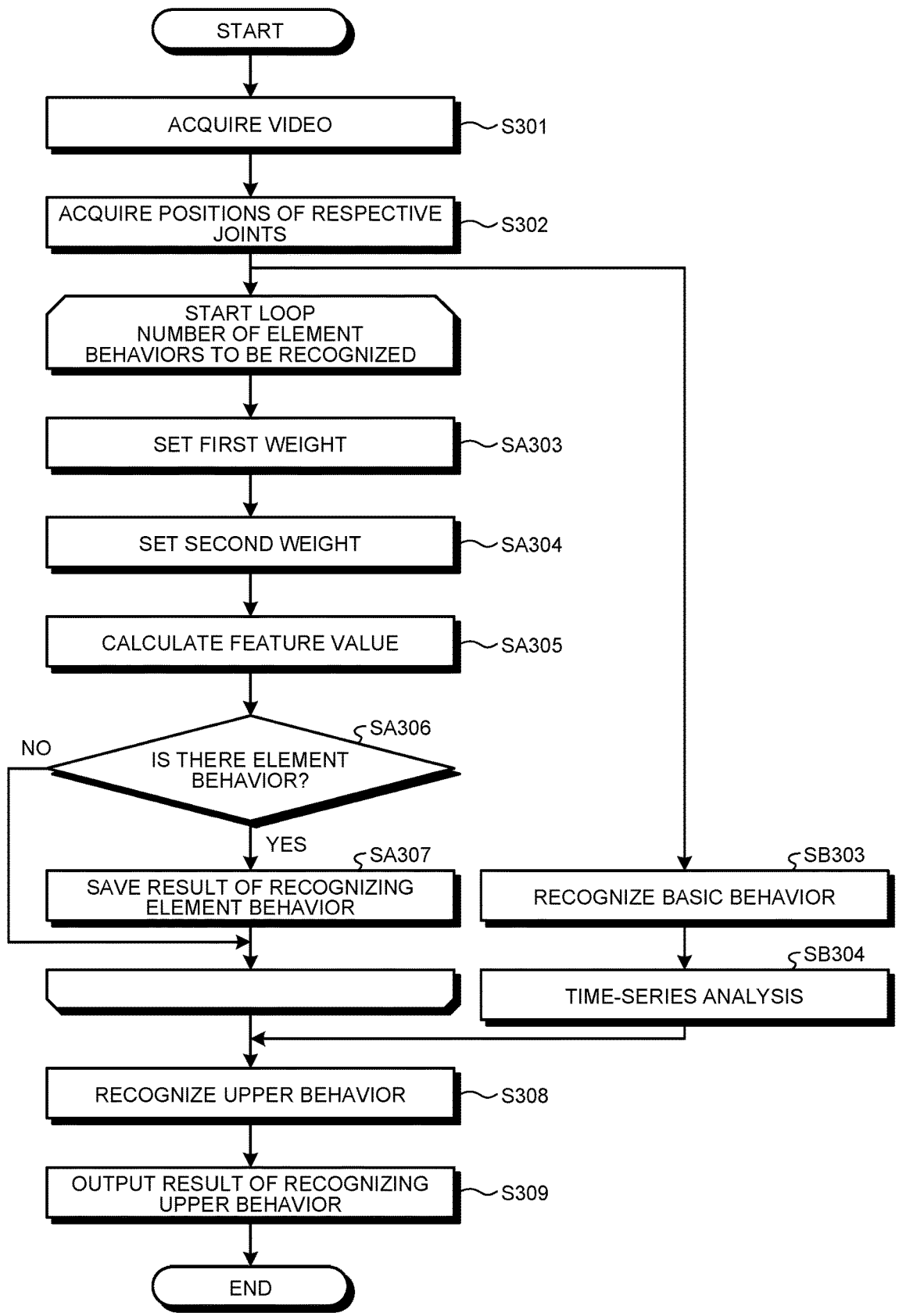
FIG. 9 is a flowchart representing a procedure of a behavior recognition process according to the first embodiment.

FIG. 9 is a flowchart representing a procedure of the behavior recognition process according to the first embodiment. As an example, the process can be started when the video acquisition unit 11 acquires a video of a new frame.

As illustrated in FIG. 9, the video acquisition unit 11 acquires a frame of a video from the camera 2, or the like (step S301). The skeleton information acquisition unit 12 inputs the video that is acquired at step S301 to the motion capture engine, thereby acquiring skeleton information containing the position of each joint (step S302).

After step S302, an A process of steps SA303 to SA307 on an element behavior and a B process of steps SB303 and SB304 are performed in parallel. The A process and the B process need not necessarily be executed in parallel and may be executed in series. In this case, the A process and the B process can be executed in random order.

For example, at step SB303, the basic motion recognition unit 13 inputs the position of each joint that is acquired at step S302 to the model that have learnt basic motions, thereby acquiring a result of recognizing a basic motion that is output from the model. At step SB304, the time-series analyzer 14A analyzes whether the basic motion that is recognized at step SB303 corresponds to a given time-series pattern.

As described, when the basic motion is recognized at step SB303, the basis motion is saved in a work area of a memory that is not illustrated in the drawing. When the basis motion corresponds to the time-series pattern at step SB304, an element behavior corresponding to the time-series pattern of the basic motion is saved in the work area of the memory not illustrated in the drawing.

On the other hand, the process from step SA303 to step SA307 is repeated on each frame for the number of times corresponding to the number of element behaviors that are subjects to be recognized.

In other words, the calculator 17A refers to the first weight data that is stored in the first weight storage 18 and, for each element behavior that is a subject to be recognized, sets a first weight $w^i$ to be applied to each joint i=1, . . . , N that is used to calculate a relative position to a joint n of which speed feature is calculated (step SA303).

Subsequently, the calculator 17A refers to the second weight data that is stored in the second weight storage 19 and sets a second weight b to be applied to each joint n=1, . . . , N of which speed feature is calculated and to each joint i=1, . . . , N in a frame t−k that is used to calculate a relative position with respect to the joint n (step SA304).

The calculator 17A then further assigns, to Equation (1) above, speed features $f_s(x^t_1)$ to $f_s(x^t_N)$ in N frames that are obtained by assigning the position of each joint in the frame t and the position of each joint in the frame t−k to Equation (2) after setting of the first weight $w^i$ and the second weight $b_n$, thereby calculating a speed feature of the element behavior in the frame t (step SA305).

When the element behavior is recognized at step SA306 (YES at step SA306), the element behavior that is recognized at step SA306 is saved in the work area of the memory not illustrated in the drawing (step SA307). On the other hand, when the element behavior is not recognized at step SA306 (NO at step SA306), the above-described process at step SA307 is skipped.

After steps SB304 and SA307 end, the rule collator 14B collates the basic behavior that is recognized at step SB303, the element behavior that is recognized at step SB304, and the element behavior that is recognized at step SA307 and the rule that is stored in the rule storage 15 (step S308).

The rule collator 14B outputs a result of recognizing an upper behavior to a given output destination (step S309). The "output destination" herein may be any hardware or software. For example, the result of recognizing the upper behavior can be output to a service or a function of executing any backend process according to the result of recognizing the upper behavior. Alternatively, a display device, an audio output device, an information processing device, or a mobile terminal device that is set by the user U of the above-described behavior recognition service 1 may be notified of the result of recognizing the upper behavior. Any form of notification, such as the web or an e-mail, may be used.

One Aspect of Effect

As described above, when recognizing an element behavior based on time-series data of the positions of the respective joints, the behavior recognition device 10 according to the first embodiment recognizes an element behavior that is a subject to be recognized based on a feature value that is calculated using weights that are to be applied to the respective joints and that are changed according to the type of the element behavior. This inhibits motions that appear in other physical parts other than a physical part corresponding to an element behavior that is a subject to be recognized from preventing the recognition. Accordingly, according to the behavior recognition device 10 according to the first embodiment, it is possible to realize recognition of an element behavior that is not preset as an example of a behavior of which move appears in part of the body. Furthermore, according to the behavior recognition device 10 according to the first embodiment, when an element behavior that is not preset is added to the rule, it is also possible to eliminate the time and effort to newly set a time-series pattern that is used in time-series analysis.

[b] Second Embodiment

The embodiment of the disclosed device has been described and the disclosure may be carried out in various different modes in addition to the above-described embodiment. Another embodiment covered by the disclosure will be described below.

Range of Application of Implementation of Recognition of Element Behavior

In the above-described first embodiment, the example in which recognition of an element behavior is realized using the first weights and the model parameter that are learnt according to the SVM algorithm is exemplified as an example only; however, the recognition is not limited to this, and recognition of an element behavior may be realized by any method. As an example thereof, an example in which recognition of an element behavior is realized by a GCNN (Graph Convolutional Neural Networks) that performs a convolution operation on a graph is exemplified.

Figure 10:
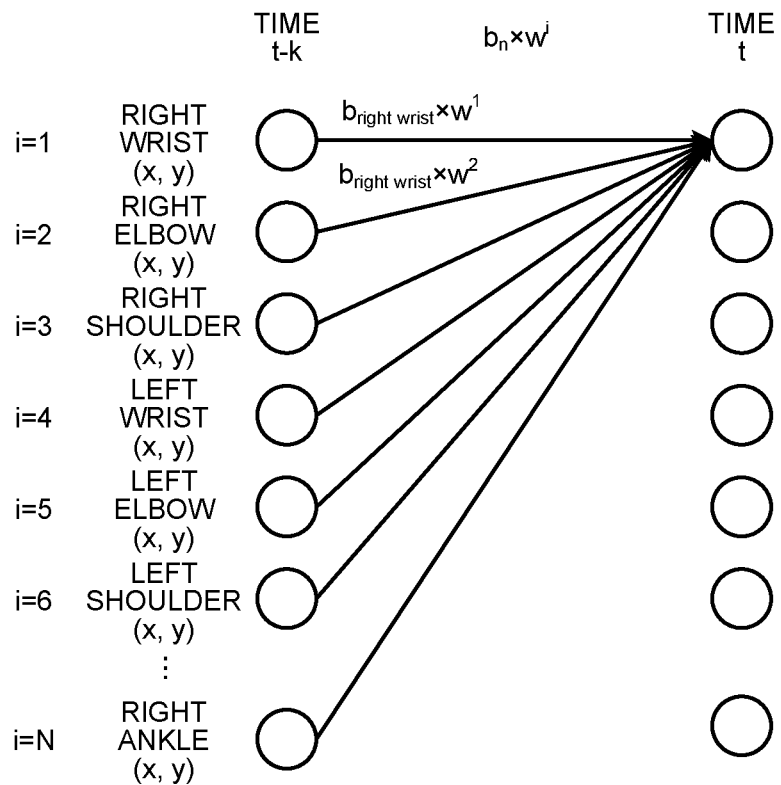
FIG. 10 is a diagram illustrating an example of application to a GCNN.
Figure 11:
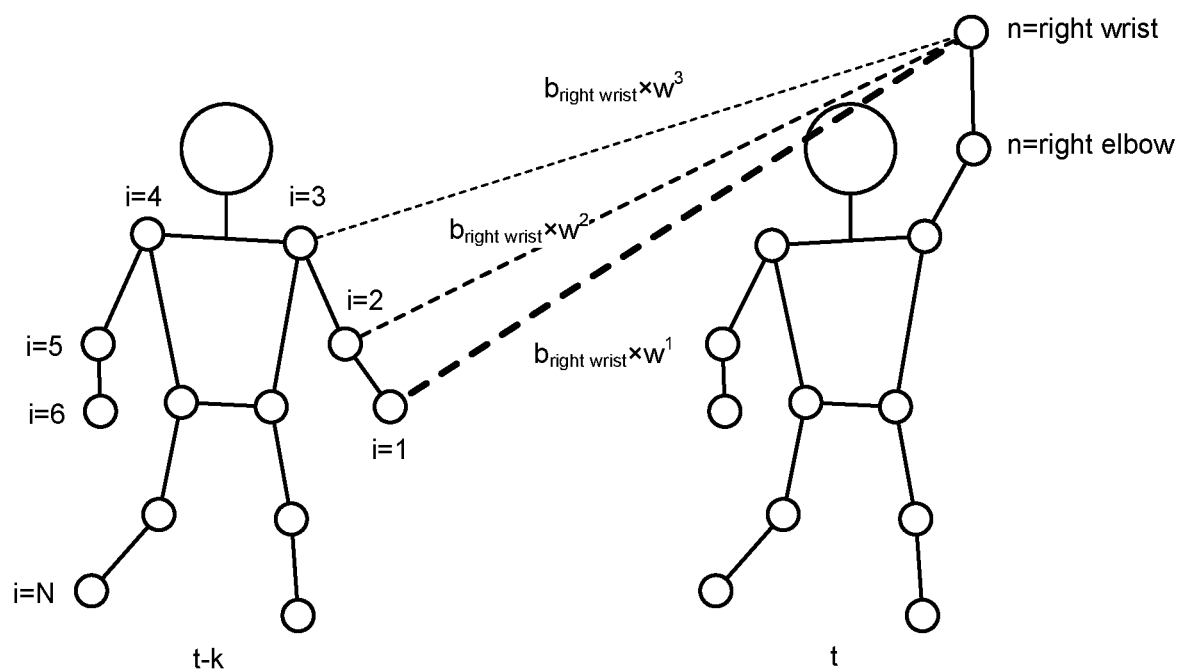
FIG. 11 is a schematic diagram illustrating an image of parameters.

FIG. 10 is a diagram illustrating an example of application to the GCNN. FIG. 11 is a schematic diagram schematically illustrating an image of parameters. FIG. 10 illustrates the GCNN in which joints are expressed by nodes and a human body structure is expressed using a graph structure. Furthermore, FIGS. 10 and 11 exemplify a convolution operation that is performed when a speed feature $f_s(x^t_{right\ wrist})$ of the joint of the right wrist in a frame t among speed features of N joints in the frame t is calculated (when n=1).

According to Equation (2), when a speed feature $f_s(x^t_{right\ wrist})$ of the joint of the right wrist in the frame t is calculated, a relative position is calculated between a position $(x^t_1, y^t_1)$ of a joint n=1 in the frame t and a position $(x^{t-k}_i, y^{t-k}_i)$ of each joint i=1, ..., N in a frame t−k. To each of these N relative positions $(x^t_n - x^{t-k}_i)$, a second weight $b_{right\ wrist}$×first weight $w^i$ is applied.

On the other hand, in the GCNN model illustrated in FIG. 10, second weight $b_{right\ wrist}$×first weight $w^i$ is applied to a position $(x^{t-k}_i, y^{t-k}_i)$ of each joint i=1, ..., N in the frame t−k. The position $(x^{t-k}_i, y^{t-k}_i)$ of the joint i=1, ..., N in the frame t−k to which the second weight $b_{right\ wrist}$×first weight $w^i$ is applied as described above is convoluted in the position $(x^t_1, y^t_1)$ of the joint n=1 of the right wrist of n=1 in the frame t.

Schematic representation thereof results in FIG. 11. For example, as illustrated in FIG. 11, when i=1, second weight $b_{right\ wrist}(=1)$×first weight $w^1(=1)$ is applied to a position $(x^{t-k}_{right\ wrist}, y^{t-k}_{right\ wrist})$ of the joint of the right wrist of i=1 in the frame t−k. When i=2, second weight $b_{right\ wrist}(=1)$× first weight $w^2(=½)$ is applied to a position $(x^{t-k}_{right\ elbow}, y^{t-k}_{right\ elbow})$ of the joint of the right elbow of i=2 in the frame t−k. When i=3, second weight $b_{right\ wrist}(=1)$× first weight $w^3(=¼)$ is applied to a position $(x^{t-k}_{right\ shoulder}, y^{t-k}_{right\ shoulder})$ of the joint of the right shoulder of i=3 in the frame t−k. A first weight and a second weight are similarly applied to i=4 and the followings. For example, when i=N, second weight $b_{right\ wrist}(=0)$×first weight $w^N(=1/128)$ is applied to a position $(x^{t-k}_{left\ ankle}, y^{t-k}_{left\ ankle})$ of the joint of the left ankle of i=N in the frame t−k. By performing a process similar to the model training process illustrated in FIG. 8, second weight $b_{right\ wrist}$×first weight $w^i$ can be learnt as weights of synapses of the GCNN model.

As described above, also in the GCNN model, the position $(x^{t-k}_i, y^{t-k}_i)$ of the joint i=1, ..., N in the frame t−k to which second weight $b_{right\ wrist}$×first weight $w^i$ is applied according to Equation (2) above is convoluted in a position $(x^t_1, Y^t_1)$ of the joint n=1 of the right wrist of n=1 in the frame t. Also for the speed feature $f_s(x^t_n)$ of a joint at or after n=2 in the frame t, a similar convolution operation is performed. As a result of executing such a convolution operation up to n=N, a result of recognition of an element behavior that is a subject to be recognized (true or false) or a certainty factor of the element behavior is output from an output layer of the GCNN model.

As described above, it is clear that it is possible to realize the above-described recognition of an element behavior using the GCNN model or by any other method except for the example represented in the above-described first embodiment.

Range of Application of Subject to be Recognized

In the above-described first embodiment, an element behavior is exemplified simply as an example of a behavior that is a subject to be recognized; however, the behavior is not limited thereto. As an example only, the behavior that is a subject to be recognized may be a general behavior of which move appears in part of a body, for example, a partial behavior. For example, when a partial behavior is a subject to be recognized, the partial behavior may be recognized based on a feature value that is calculated from time-series data on the positions of respective joints using weights that are to be applied to the respective joints and that are changed according to the type of the partial behavior. In other words, reading the "element behavior" in the description of the element behavior recognition unit 17 as a "partial behavior" enables realization of recognition of the partial behavior as in recognizing an element behavior.

Distribution and Integration

Each component of each device illustrated in the drawings is not necessarily configured physically as illustrated in the drawings. In other words, specific forms of distribution and integration of devices are not limited to those illustrated in the drawings and all or part of the components may be configured by being distributed or integrated functionally or physically in any unit according to various types of load and usage. For example, the video acquisition unit 11, the skeleton information acquisition unit 12, the basic motion recognition unit 13, the upper behavior recognition unit 14 or the element behavior recognition unit 17 may be connected as an external device of the behavior recognition device 10 via a network. Different devices may include the video acquisition unit 11, the skeleton information acquisition unit 12, the basic motion recognition unit 13, the upper behavior recognition unit 14, and the element behavior recognition unit 17, respectively, and may be connected via a network and cooperate with one another, thereby implementing the functions of the above-described behavior recognition device 10.

Behavior Recognition Program

It is possible to implement the various processes described in the above-described embodiments by executing a program that is prepared previously using a computer, such as a personal computer or a work station. Using FIG. 12, an example of a computer that executes a behavior recognition program with the same function as those of the above-described first and second embodiments will be described.

Figure 12:
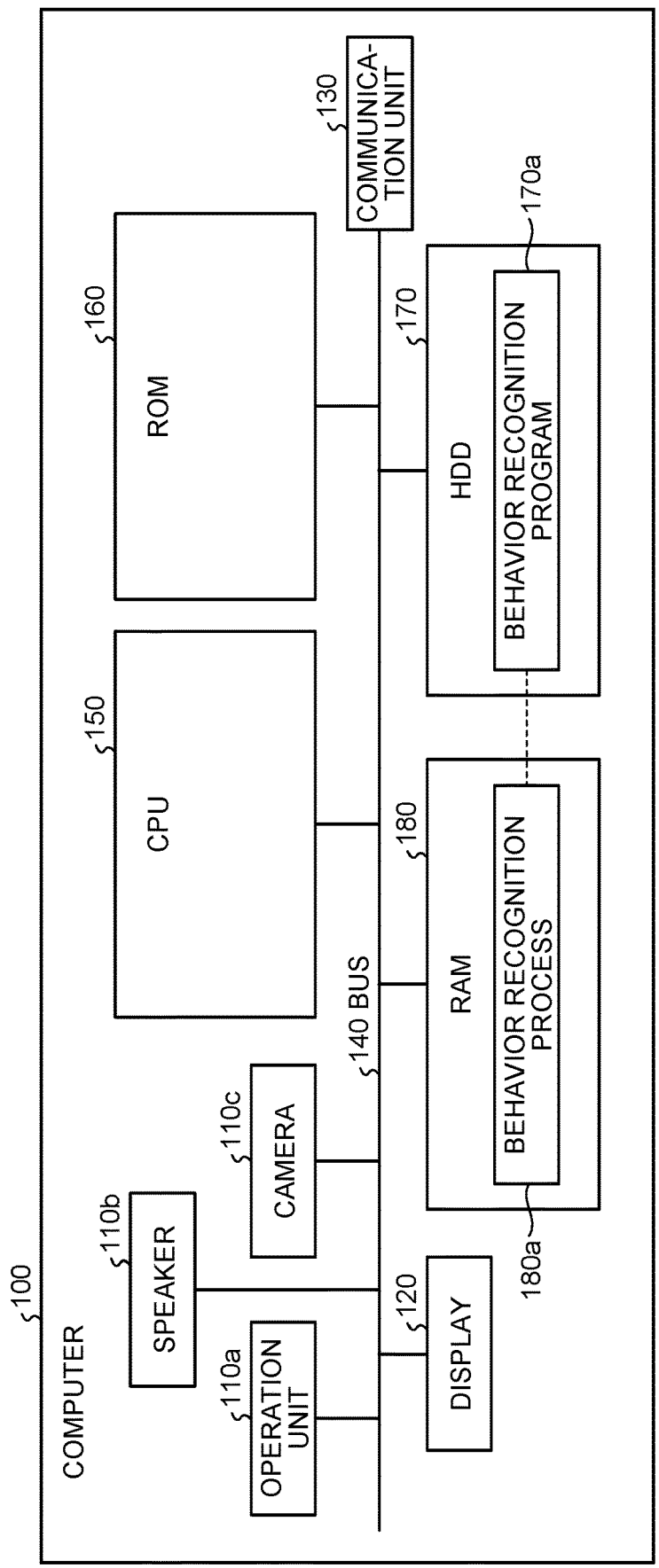
FIG. 12 is a diagram illustrating an example of a hardware configuration of a computer.

FIG. 12 is a diagram illustrating an example of a hardware configuration of the computer. As illustrated in FIG. 12, a computer 100 includes an operation unit 110a, a speaker 110b, a camera 110c, a display 120, and a communication unit 130. The computer 100 further includes a CPU 150, a ROM 160, a HDD 170, and a RAM 180. The units 110 to 180 are connected with one another via a bus 140.

As illustrated in FIG. 12, a behavior recognition program 170a that implements the same functions as those of the video acquisition unit 11, the skeleton information acquisition unit 12, the basic motion recognition unit 13, the upper behavior recognition unit 14, and the element behavior recognition unit 17 is stored in the HDD 170. The behavior recognition program 170a may be integrated or separated as the components of the video acquisition unit 11, the skeleton information acquisition unit 12, the basic motion recognition unit 13, the upper behavior recognition unit 14, and the element behavior recognition unit 17 may be. In other words, all the data represented in the above-described embodiment need not necessarily be stored in the HDD 170, and data that is used for processes may be stored in the HDD 170.

Under the circumstances, the CPU 150 reads the behavior recognition program 170a from the HDD 170 and then loads the behavior recognition program 170a in the RAM 180. As a result, as illustrated in FIG. 12, the behavior recognition program 170a functions as a behavior recognition process 180a. The behavior recognition process 180a loads various types of data that are read from the HDD 170 in an area assigned to the behavior recognition process 180a in the storage area of the RAM 180 and executes various processes using the loaded various types of data. For example, examples of the process that is executed by the behavior recognition process 180a include the processes represented in FIGS. 8 and 9. In the CPU 150, all the processors represented in the above-described first embodiment need not necessarily operate, and a processor corresponding to a process to be executed may be implemented virtually.

The behavior recognition program 170a need not necessarily be stored in the HDD 170 or the ROM 160 from the beginning. For example, the behavior recognition program 170a may be stored in a "portable physical medium", such as a flexible disk that is inserted into the computer 100, that is, a FD, a CD-ROM, a DVD disc, a magneto-optical disc, or an IC card. The computer 100 may acquire the behavior recognition program 170a from the portable physical medium and execute the behavior recognition program 170a. The behavior recognition program 170a may be stored in another computer or a server device that is connected to the computer 100 via a public line, the Internet, a LAN, or a WAN, and the computer 100 may acquire the behavior recognition program 170a from the computer or the server device and execute the behavior recognition program 170a.

It is possible to realize recognition of a behavior of which move appears in part of a body.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A behavior recognition method comprising:
acquiring positions of a plurality of respective joints;
recognizing a partial behavior that is a subject to be recognized based on a feature value that is calculated from the positions of the respective joints using weights that are to be applied to the respective joints and that are changed according to a type of the partial behavior, by a processor;
referring to weight data in which the weights to be applied to the respective joints have been learnt according to a given machine learning algorithm and calculating, from time-series data on the positions of the respective joints, a feature value based on relative positions between a position of a joint in a first time point and the positions of the respective joints at a second time point that is before the first time point; and
determining whether there is the partial behavior based on the calculated feature value and a model that has learnt a parameter according to the machine learning algorithm.

2. The behavior recognition method according to claim 1, wherein the recognizing includes further changing the weights to be applied to the respective joints according to cooperativity among the joints.

3. The behavior recognition method according to claim 1, wherein the recognizing includes recognizing an element behavior corresponding to a time-series pattern of the partial behavior based on a feature value that is calculated from time-series data on the positions of the respective joints using weights that are to be applied to the respective joints and that are changed according to a type of the element behavior.

4. The behavior recognition method according to claim 1, wherein the recognizing includes recognizing the partial behavior based on an output from a model that is obtained by inputting time-series data on the positions of the respective joints to the model that performs an operation of convoluting the positions of the joints at a second time point before a first time point in a position of a joint at the first time point based on weights to be applied to synapses that connect nodes corresponding to the respective joints.

5. A non-transitory computer-readable recording medium storing therein a behavior recognition program that causes a computer to execute a process comprising:
   acquiring positions of a plurality of respective joints;
   recognizing a partial behavior that is a subject to be recognized based on a feature value that is calculated from the positions of the respective joints using weights that are to be applied to the respective joints and that are changed according to a type of the partial behavior;
   referring to weight data in which the weights to be applied to the respective joints have been learnt according to a given machine learning algorithm and calculating, from time-series data on the positions of the respective joints, a feature value based on relative positions between a position of a joint in a first time point and the positions of the respective joints at a second time point that is before the first time point; and
   determining whether there is the partial behavior based on the calculated feature value and a model that has learnt a parameter according to the machine learning algorithm.

6. The non-transitory computer-readable recording medium according to claim 5, wherein the recognizing includes further changing the weights to be applied to the respective joints according to cooperativity among the joints.

7. The non-transitory computer-readable recording medium according to claim 5, wherein the recognizing includes recognizing an element behavior corresponding to a time-series pattern of the partial behavior based on a feature value that is calculated from time-series data on the positions of the respective joints using weights that are to be applied to the respective joints and that are changed according to a type of the element behavior.

8. The non-transitory computer-readable recording medium according to claim 5, wherein the recognizing includes recognizing the partial behavior based on an output from a model that is obtained by inputting time-series data on the positions of the respective joints to the model that performs an operation of convoluting the positions of the joints at a second time point before a first time point in a position of a joint at the first time point based on weights to be applied to synapses that connect nodes corresponding to the respective joints.

9. A behavior recognition device comprising:
   a processor configured to:
      acquire positions of a plurality of respective joints; and
      recognize a partial behavior that is a subject to be recognized based on a feature value that is calculated from the positions of the respective joints using weights that are to be applied to the respective joints and that are changed according to a type of the partial behavior;
      refer to weight data in which the weights to be applied to the respective joints have been learnt according to a given machine learning algorithm and calculate, from time-series data on the positions of the respective joints, a feature value based on relative positions between a position of a joint in a first time point and the positions of the respective joints at a second time point that is before the first time point; and
      determine whether there is the partial behavior based on the calculated feature value and a model that has learnt a parameter according to the machine learning algorithm.

10. The behavior recognition device according to claim 9, wherein the processor is further configured to change the weights to be applied to the respective joints according to cooperativity among the joints.

11. The behavior recognition device according to claim 9, wherein the processor is further configured to recognize an element behavior corresponding to a time-series pattern of the partial behavior based on a feature value that is calculated from time-series data on the positions of the respective joints using weights that are to be applied to the respective joints and that are changed according to a type of the element behavior.

12. The behavior recognition device according to claim 9, wherein the processor is further configured to recognize the partial behavior based on an output from a model that is obtained by inputting time-series data on the positions of the respective joints to the model that performs an operation of convoluting the positions of the joints at a second time point before a first time point in a position of a joint at the first time point based on weights to be applied to synapses that connect nodes corresponding to the respective joints.

* * * * *